United States Patent
Bohanec

[15] 3,707,109
[45] Dec. 26, 1972

[54] CAMERA STRAP RETRACTOR

[72] Inventor: August Bohanec, 44 N. Mantor Avenue, Pasadena, Calif. 91101

[22] Filed: Feb. 14, 1972

[21] Appl. No.: 225,774

Related U.S. Application Data

[62] Division of Ser. No. 171,265, Aug. 12, 1971.

[52] U.S. Cl.....................95/86, 224/8 V, 242/107.4
[51] Int. Cl................................................G03b 17/56
[58] Field of Search............224/5 V; 242/107, 107,4; 95/86

[56] References Cited

UNITED STATES PATENTS

| | | | |
|---|---|---|---|
| 3,323,750 | 6/1967 | Worth et al. | 242/107.4 |
| 3,547,371 | 12/1970 | Gruseck | 242/107 R |
| 3,632,058 | 1/1972 | Stoffel | 242/107.4 |

FOREIGN PATENTS OR APPLICATIONS

| 533,744 | 9/1931 | Germany | 224/5 V |
|---|---|---|---|

Primary Examiner—Samuel S. Matthews
Assistant Examiner—E. M. Bero
Attorney—Robert L. Parker et al.

[57] ABSTRACT

An accessory for a camera includes a rigid strap connector having a collar portion and an end portion adapted to connect to an end of a flexible carrying strap. An adapter is rotatably disposed in the collar and held in substantially fixed axial relationship with it. An axial bore in the adapter mounts over an eye connector on the camera body. A transverse bore intersects the axial bore. A retaining pin fits through the transverse bore and the hole of the eye connector to secure the adapter to the camera. A spring bias mechanism urges the strap connector to rotate relative to the adapter. Stop means prevents such relative rotation beyond a prefixed angular position. Preferably, an entry hole is provided in the strap connector so that the retaining pin can be pushed into the transverse bore. In this arrangement, the accessory can be pre-assembled and installed on a camera with a minimum effort.

12 Claims, 4 Drawing Figures

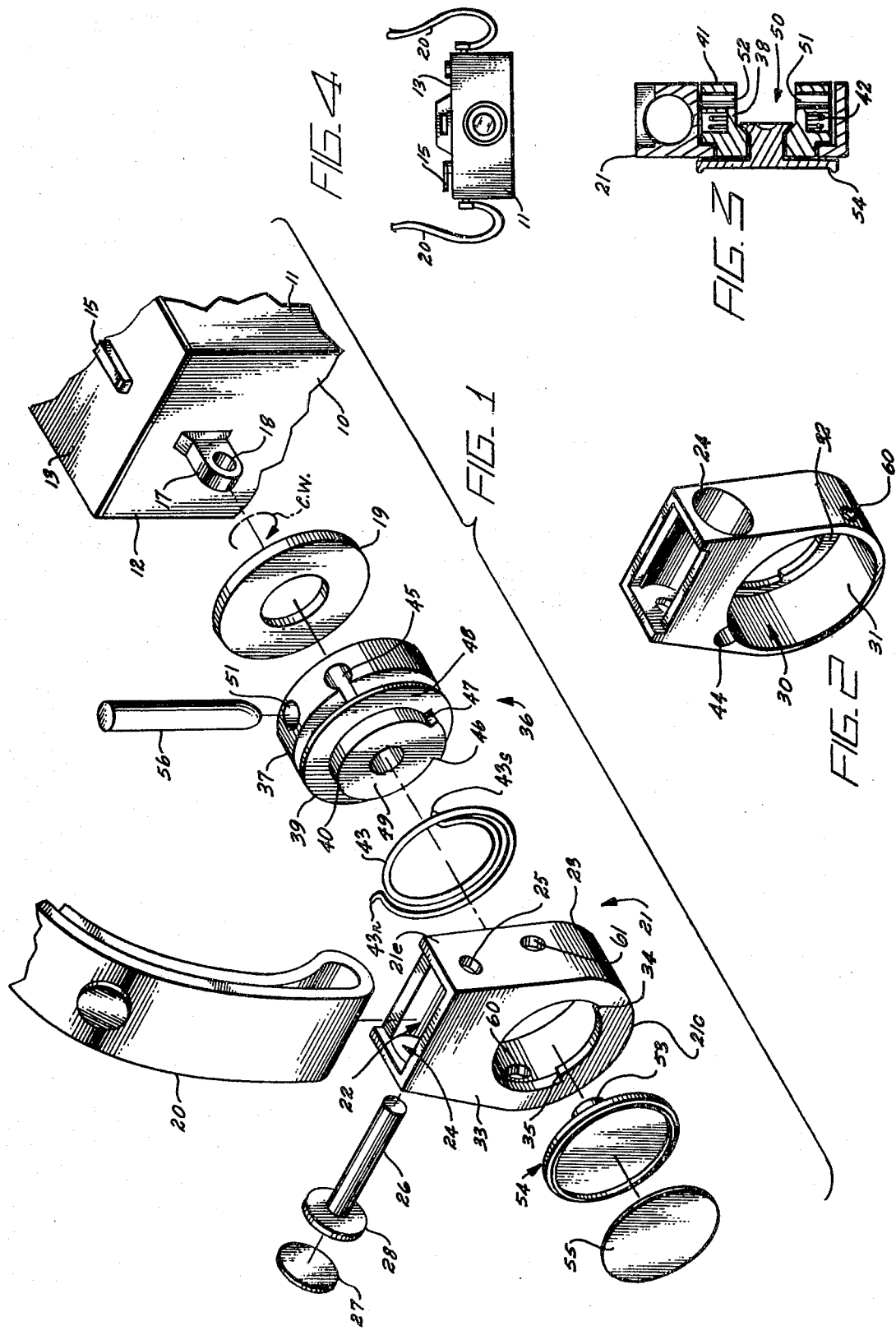

3,707,109

CAMERA STRAP RETRACTOR

CROSS REFERENCE TO RELATED PATENT APPLICATION

This is a continuation-in-part of my copending application, Ser. No. 171,265, filed Aug. 12, 1971, entitled CAMERA STRAP RETRACTOR.

BACKGROUND OF PRIOR ART

The flexible straps connected to conventional eye connectors on camera bodies are a great aid to the photographer while he is carrying the camera, but frequently are a nuisance while he is taking a picture. One problem attendant flexible straps manifests itself when the photographer picks up the camera from a table and tries to take a picture quickly. Since the carrying strap is not held upright, it droops in front of the camera lens and obscures the field of view. In the range finder viewer type of camera, the photographer will not see the strap while he is composing the picture and consequently his picture may be flawed. Another problem occurs when the photographer has the carrying strap looped around his neck and he raises the camera from his waist to eye height to look through the viewfiender and take a picture. Because the flexible strap is loose while the camera is at eye height, the strap flops around and interferes with immediate access to the cocking mechanism and the shutter release. Thus the photographer has to take the time to grab the attached end of the flexible strap and hold it in a convenient position and as a result he may lose the opportunity to take a picture quickly.

Since an enormous number of camera bodies and flexible straps have already been marketed it is desirable to provide a device for solving these problems which is adapted to fit the existing camera bodies, is easy to install, and, preferably is both economical and attractive looking.

While retraction devices are known, the prior art retraction devices have been adapted for retracting rigid handles such as suitcase handles and the like rather than flexible straps. Furthermore, the prior art retraction devices are part of an overall assembly and are not adapted to be installed as an accessory.

SUMMARY OF THE INVENTION

This invention is directed to a carrying strap accessory adapted to connect a flexible strap to the conventional eye connectors on the body of a camera and which is automatically operable when the strap is released to move the strap out of the field of view of the camera lens.

The accessory includes a rigid strap connector having a collar portion and an end portion which is adapted to connect to an end portion of the flexible strap. An eye connector adapter having a generally cylindrical configuration is rotatably disposed in the collar and held in substantially fixed axial relationship therewith. The adapter has an axial bore so that the adapter can slip over the eye connector. A bore transverse to and intersecting the axial bore is provided in the adapter. A retaining pin is inserted through the transverse bore and through the hole of the eye connector so as to secure the adapter to the camera. A spring bias mechanism urges the strap connector to rotate relative to the adapter. Stop means are provided to prevent such relative rotation beyond a prefixed angular position.

Preferably, means are provided substantially permanently to secure the adapter and the spring bias mechanism in the strap connector to form a pre-assembled unit. The strap connector has at least one entry hole to provide a passageway for the retaining pin to be inserted while the transverse bore is held in alignment with the entry hole.

Preferably, the carrying strap is a shoulder type strap and has its opposite ends connected by strap retractors to respective eye connectors. The intermediate portion of the flexible strap is looped over the photographer's neck, opposite end portions of the strap are upright and support the camera which hangs in front of the photographer's chest. The weight of the camera orients each strap connector relative to its mating adapter to a predetermined angle and thereby preloads the spring bias mechanism. When the photographer lifts the camera to eye height to compose a picture, each spring bias mechanism forces its associated strap connector to rotate and the attached end portion of the flexible strap revolves until it is aligned with a side of the camera body so that the camera has immediate and easy access to the camera controls such as the cocking mechanism and shutter release.

BRIEF DESCRIPTION OF THE DRAWINGS

FIG. 1 is an exploded perspective view illustrating the presently preferred embodiment of the invention;

FIG. 2 is a perspective view of the strap connector 21 showing its inwardly facing surface which is not visible in FIG. 1;

FIG. 3 is a cross-sectional view illustrating the invention as it is pre-assembled; and FIG. 4 is a sketch illustrating the orientation of opposite end portions of the flexible strap relative to the camera while the camera is being used and shows the upwardly opening U-shaped bend in the flexible strap.

DETAILED DESCRIPTION

In the drawings, a camera body or housing 10 has a front side 11 where the camera lens (FIG. 4) is mounted, a right end side 12, normally held in the photographer's right hand while he takes a picture, and a top side 13. The camera has a cocking arm 15 which is supported by the top side 13. A conventional eye connector 17 is mounted on the right hand side 12. The left hand side of the camera has an identical eye connector. Eye connector 17 has a circular bore 18 through it, the axis of the bore being parallel to the central line of sight of the camera lens. In most types of camera bodies, the eye connector is mounted on chamfered side of the camera body, and the axis of the circular bore intersects the central line of sight of the lens at about a 45° angle.

A circular washer 19, preferably made of rubber or resilient material, and having a thickness corresponding to the distance between the camera body and the vertical tangent to the circular bore 18, slides over and encircles the eye connector 17. Circular washer 19 provides for shock absorption and protects the finish on the portion of the camera body adjacent to the eye connector.

A looped end portion 20 of an elongated, flat, flexible carrying strap is shown in FIG. 1 in an upwardly extending position. Preferably, the carrying strap is made of nylon, but can be made of leather, fabric or the like, and is long enough to extend from one eye connector to the other.

A rigid strap connector 21, which in the preferred embodiment is a machine-finished, die-cast aluminum piece, is adapted to connect to the looped end portion 20. To this end, the strap connector includes an end portion 21e having an outwardly opening, substantially U-shaped channel 22 for receiving the looped end portion 20. An exterior surface 23 of the strap connector has the same general shape as an elongated, flat ribbon, looped into the shape of a U, with the opposite sides of the U converging toward each other. The channel 22 extends between the two opposite sides of the U. The surface 23 has a relatively large diameter circular hole 24 and a relatively small diameter circular hole 25 opening the channel 22 at opposite ends.

A shank portion 26 of a fastener is inserted to extend through the hole 24, the looped end portion 20 of the strap, and the hole 25, and its end makes a friction fit with the hole 25. A leather-like cover 27 is glued onto a cylindrical head portion 28 of the fastener.

Cover 27 can be color-coordinated with the strap to improve the overall appearance of the strap connector.

A collar portion 21c of the strap connector is integral with the end portion 21e. A receptacle 30 is defined in the collar by a cylindrical interior surface 31 and an annular interior surface 32. The cylindrical interior surface 31 is concentric with the semi-circular portion of the exterior surface 23.

A portion of a generally U-shaped exterior end surface 33 of the strap connector together with the annular interior surface 32 defines a circular flange. A stop shoulder 34 is defined at one end of an arcuate, radially inwardly projecting tab which is integral with the circular flange. A stop shoulder 35 is defined at the opposite end of the inwardly projecting tab.

An adapter 36 is rotatably disposed in the receptacle 30. Preferably, the adapter 36 is a unitary, machine-finished, die-cast aluminum piece. The adapter has four integral, axially aligned disk portions 37, 38, 39, and 40. Disk portion 37 forms the inner or camera facing end portion of the adapter and has an outer annular surface 41 that bears against the washer 19. Disk portions 37 and 39 are axially spaced apart and their outer circumferential surfaces bear against the cylindrical surface 31 of the receptacle 30. Disk portion 38 joins the disk portions 37 and 39 and is necked down to define an annular recess 42.

A helical torsion spring 43 having hooked ends 43r and 43s is disposed in the annular recess. A notch 44 in the cylindrical surface 31 and extending parallel to the axis of the receptacle 30 opens into the annular recess to receive the hooked end 43r. A notch 45 in the disk portion 37 and extending perpendicular to its axis opens into the annular recess to receive the hooked end in 43s. The spring 43 is wound in a counterclockwise direction, from one hooked end to the other. The spring 43 is pre-loaded by clockwise rotation of the hooked end 43r relative to the hooked end 43s. The spring 43 in use thus urges the strap connector to rotate in a counterclockwise direction relative to the adapter.

Disk portion 40 forms the end of the adapter that faces outwardly away from the camera. A stop shoulder 46 is defined at one end of an arcuate, radially outwardly projecting tab integral with the disk portion 40. A stop shoulder 47 is defined at the opposite end of the outwardly projecting tab. The outer circumferential surface of the outwardly projecting tab is radially spaced from the axis of the adapter by an amount such that the stop shoulder 34 will butt into stop shoulder 46 to prevent spring caused rotation of the strap connector relative to the adapter beyond a prefixed angle. Also, stop shoulder 35 will but into stop shoulder 47 to prevent overloading the spring. By virtue of the two cooperating pairs of stop shoulders, the strap connector is limited so that it can rotate relative to the adapter through an arc approximately one-half of a revolution.

A generally annular surface 48 of the disk portion 39 bears against the annular interior surface 32 of the strap connector. The end surface 49 of the disk portion 40 is coplanar with the exterior end surface 33 of the strap connector.

A stepped bore 50 extends axially through the adapter giving each disk portion of the adapter a ring configuration. A pair of diametrically opposed holes 51 and 52 in the ring formed by portion 37 define a bore which is transverse to and intersecting the stepped bore 50.

The adapter is held in substantially fixed axial relationship with the collar. To this end, a shank portion 53 of an end cap 54 is inserted into the stepped bore 50. A cover 55 similar to cover 37 is glued onto the end cap 54. Preferably, a recess is provided in the end of the shank portion to define a cylindrical lip. After the shank portion is inserted into the stepped bore, the cylindrical lip is flared radially outwardly so as to bear against the step of the bore. Thus, in the preferred embodiment, the adapter, the spring, and the strap connector form a pre-assembled strap retractor and are substantially permanently held in fixed axial relationship.

When the adapter is connected to the camera, the stepped bore has its larger diameter portion surrounding the eye connector 17. A retaining pin 56 extends through transverse bore in the adapter portion 37 and through the bore 18 in the eye connector.

Preferably, the pre-assembled strap retractor is connected to the camera body in the following manner. First, the strap connector and the adapter are manually rotated relative to one another to a predetermined angle. At this predetermined angle, an entry hole 60 in the strap connector is aligned with the hole 51 in the adapter. Then the retaining pin 56 is slided through the entry hole 60 and into the hole 51 temporarily to hold the two holes is alignment. Now, with the washer 19 encircling the eye connector, the pre-assembled strap retractor is held flush against the washer with the stepped bore surrounding the eye connector and with the retaining pin pointing toward bore 18 in the eye connector. The retaining pin is now pushed through the bore 18. When the retaining pin reaches the proper position, it clears the entry hole 60. The urging action of the spring 43 will snap the strap connector so that it rotates until the stop shoulder 34 butts into the stop shoulder 46. To facilitate removal of pre-assembled strap retractor, preferably, another hole 61 is provided in the strap connector. When the strap connector is manually rotated to and then held at the predetermined angle wherein holes 60, 51, 52, and 61 are aligned, the retaining pin can be pushed out. As mentioned above, the strap connector is limited so that it can rotate relative to the adapter from a first prefixed angle through an arc of approximately one-half of a revolution to a second prefixed angle. At the first prefixed angle, the looped end of the strap extends downwardly substantially parallel to the end side of the camera. At the second prefixed angle, the looped end extends upwardly preferably, the predetermined angle at which the holes for the retaining pin are aligned is closer to the first than the second prefixed angle. The possibility of the retaining pin falling out is minimized because this predetermined angle is seldom maintained for very long during operation.

With reference to the indicated clockwise (CW) direction indicated by the arrow in FIG. 1, consider now the automatic retraction operation of this invention. When the carrying strap is raised to its carrying position, and placed in tension by the weight of the camera, the strap connector 21 rotates clockwise and the adapter remains stationary with respect to the camera. The notch 45 of the adapter holds the hooked end 43s of the spring stationary. Notch 44 of the strap connector acts against the hooked end 43r of the spring and the spring is tightened. When the tension is removed from the strap by releasing it or by lifting the camera, the spring bias force automatically rotates the strap connector counterclockwise until stop shoulder 34 butts into the top shoulder 46 of the adapter, thereby stopping the rotation at a prefixed angle. Preferably, as shown in FIG. 4, when the strap connector is at this prefixed angle, the end portion 20 of the strap is aligned parallel to the right end side 12 of the camera body and projects downwardly out of the way of access to the cocking mechanism 15. Since the strap is flexible it will bend in an upwardly opening U-shape while the intermediate portion of the strap is disposed around the photographer's neck.

The construction and operation of the strap retractor connecting the eye connector on the left end side of the camera to the respective end of the flexible strap is substantially the same as the foregoing.

The only difference in construction resides in the fact that the helical torsion springs are wound in different directions. The spring 43 described above is wound in a counterclockwise direction, whereas the spring in the strap retractor for the left hand side of the camera is wound in a clockwise direction. In this arrangement, the opposite looped ends of the strap revolve from an upright orientation, back toward the photographer, and around until they are aligned parallel to the respective end sides of the camera body. In other words, the opposite end portions of the strap revolve in the same direction relative to an axis defined between the two eye connectors.

The only difference in operation resides in the role played by the stop shoulders. As described above for the right end side, stop shoulder 34 butts into stop shoulder 46 to stop spring caused rotation of the strap connector relative to the adapter, and stop shoulder 35 butts into stop shoulder 47 to prevent overloading the spring. For the left hand side, stop shoulder 34 butts into stop shoulder 46 to prevent overloading the spring, and stop shoulder 35 butts into stop shoulder 47 to stop spring caused rotation of the strap connector relative to the adapter.

I claim:

1. A camera strap retractor for connecting a flexible strap to an eye connector on a side of the camera body, the retractor comprising:

a rigid strap connector adapted to connect to an end portion of the flexible strap and including a collar;

an adapter rotatably disposed in the collar and having a first bore for mounting over the eye connector, and a second bore transverse to the first bore so that a retaining pin can be inserted into the second bore and through the eye connector so as to secure the adapter thereto;

means including an end cap limiting axial displacement of the adapter relative to the collar;

a spring bias mechanism urging the strap connector to rotate relative to the adapter; and stop means preventing such relative rotation beyond a pre-fixed angular position.

2. A retractor according o claim 1 wherein the collar has an entry hole to permit passage of the retaining pin into the second bore while the adapter is disposed in the collar.

3. A retractor according to claim 2 wherein the collar includes a cylindrical interior surface surrounding a portion of the adapter; an outer surface portion abutting the retaining cap, and an arcuate tab portion having a first shoulder, and wherein the adapter includes an arcuate tab portion having a second shoulder cooperating with the first shoulder to form the stop means.

4. A retractor according to claim 3 wherein the spring bias mechanism comprises a spring having opposite hooked ends, one hooked end being held in engagement with the cylindrical interior surface and the opposite hooked end being held in engagement with the adapter.

5. A retractor according to claim 4 wherein the adapter has extending therethrough a stepped bore which includes the first bore, and the end cap has a shaft portion having a flared end abutting the step of the stepped bore.

6. A retractor according to claim 1 wherein the adapter is a unitary member comprising first and second ring portions joined by a third, necked-down ring portion and defining an annular recess in which the spring bias mechanism is disposed.

7. A retractor according to claim 6 wherein the ring portions define a stepped bore, and the end cap has a shaft portion having a flared end abutting the step of the stepped bore.

8. A retractor according to claim 7 wherein the collar includes a circular flange portion having an annular interior surface abutting a corresponding annular surface of the second ring portion, and an arcuate tab portion having a first shoulder; and wherein the adapter includes an arcuate tab portion having a second shoulder cooperating with the first shoulder to form the stop means.

9. A retractor according to claim 1 and comprising additional stop means so that the strap connector cannot rotate relative to the adapter through more than an arc somewhat less than three-quarters of a revolution.

10. A retractor according to claim 1 wherein the collar has an entry hole opening into the transverse bore when the strap connector is rotated away from the pre-fixed angular position to a predetermined angular position.

11. A retractor according to claim 10 wherein the collar has another hole aligned with the entry hole to facilitate removal of the retaining pin.

12. An accessory for a camera having a pair of eye connectors, the accessory comprising:
- an elongated, flexible carrying strap;
- a pair of strap retractors;
- each strap retractor comprising:
  - a rigid strap connector connected to an opposite end portion of the strap and including a collar; and adapter rotatably disposed in the collar and having a first bore for mounting over a respective eye connector, and a second bore transverse to and intersecting the first bore so that a retaining pin can be inserted into the second bore and through the respective eye connector so as to secure the adapter thereto; means limiting axial displacement of the adapter relative to the collar, a spring bias mechanism urging the strap connector to rotate relative to the adapter; and stop means preventing such relative rotation beyond a pre-fixed angular position;

and wherein the spring bias mechanisms urge the strap connectors to rotate relative to the adapters such that the opposite end portions of the strap revolve in the same direction relative to an axis defined between the two eye connectors.

* * * * *